United States Patent [19]
Snell

[11] Patent Number: 5,764,113
[45] Date of Patent: Jun. 9, 1998

[54] RE-SAMPLING CIRCUIT AND MODULATOR USING SAME

[75] Inventor: James Leroy Snell, Palm Bay, Fla.

[73] Assignee: Harris Corporation, Palm Bay, Fla.

[21] Appl. No.: 781,334

[22] Filed: Jan. 10, 1997

[51] Int. Cl.$^6$ .................... H03M 7/00; H04L 27/20
[52] U.S. Cl. .................... 332/103; 341/61; 375/279; 375/308; 375/354
[58] Field of Search .................... 332/103; 375/354, 375/279, 308; 341/61

[56] References Cited

U.S. PATENT DOCUMENTS

| | | | |
|---|---|---|---|
| 4,756,008 | 7/1988 | Yagi et al. | 332/104 |
| 5,412,352 | 5/1995 | Graham | 332/103 |
| 5,412,693 | 5/1995 | Bolla et al. | 375/326 |
| 5,425,057 | 6/1995 | Paff | 375/326 |
| 5,513,209 | 4/1996 | Holm | 375/354 |

OTHER PUBLICATIONS

Harris Semiconductor Product Description for Model No. HSP45116A "Numerically Controlled Oscillator/Modulator", Jul. 1996, pp. 1–16.

Harris Semiconductor Product Description for Model No. HSP43168/883 "Dual FIR Filter", Jan. 1994, pp. 3–169 to 3–189.

*Primary Examiner*—Siegfried H. Grimm
*Attorney, Agent, or Firm*—Allen, Dyer, Doppelt, Milbrath & Gilchrist, P.A.

[57] ABSTRACT

A re-sampling circuit includes a poly-phase finite impulse response (FIR) interpolator; a polynomial interpolator having a sample input connected to a sample output of the poly-phase FIR interpolator; and a numerically controlled oscillator (NCO) having an output partitioned into: Nc integer bits connected to a control input of the FIR interpolator, and Nf fractional bits connected to a control input of the polynomial interpolator. The circuit may also include a reference clock for generating a reference clock signal. The NCO preferably further comprises a sample clock generator for generating a sample clock signal based on the reference clock signal, and the FIR interpolator further has a sample clock input for receiving the sample clock signal from the sample clock generator. In addition, the polynomial interpolator also preferably has an input for clocking output samples therefrom that is connected to the reference clock so that output samples from the polynomial interpolator are clocked out based upon the reference clock signal. The re-sampling circuit may be used in a modulator, for example, also including one or more mixers.

41 Claims, 1 Drawing Sheet

RE-SAMPLING CIRCUIT AND MODULATOR USING SAME

FIELD OF THE INVENTION

The present invention is directed to the field of digital signal processing, and, more particularly, to a circuit and associated method for re-sampling a digital input signal.

BACKGROUND OF THE INVENTION

Digital signal processing circuits are widely used in many electronic circuits, such as modulators, demodulators, waveform synthesizers, etc. U.S. Pat. No. 5,412,352 to Graham, for example, discloses digital signal processing for a modulator for data transmitted in a reverse channel in a cable transmission system that requires a single frequency translation from baseband to a selected RF channel. The modulator includes a serial to parallel differential quadrature phase shift keying (QPSK) encoder with transversal finite impulse response (FIR) filters and interpolation filters connecting the PSK data to a single mixer stage for directly translating the baseband signal to the desired RF channel. The combination of the transversal FIR filter and interpolator define a two-stage re-sampling circuit.

U.S. Pat. No. 5,425,057 to Paff, for example, discloses a narrow band PSK demodulator using asynchronous sampling pulses. More particularly, the demodulator implements a digital filter which spans a time duration of eight symbols to realize a square root of raised cosine filter. The patent recognizes that one disadvantage of a conventional FIR filter is that it requires a fixed ratio between the input sample rate and the FIR filter output rate. The disclosed circuit uses a unique digital filter which provides one output per symbol while the input sample rate may vary from a low rate approaching two samples per symbol to over one hundred and twenty-eight samples per symbol. A digital phase locked loop is used for symbol tracking and employs a direct digital synthesizer (DDS) as the frequency control element. The high resolution timing phase information provided by a symbol timing numerically controlled oscillator (NCO) is used to select the filter coefficients to be applied at each sample. Accordingly, a high clock rate can be used to enable the demodulator to be tuned over a wide range of potential carrier frequencies and symbol rates.

Unfortunately, a conventional two-stage re-sampler may use a series of divide-by-two circuits for approximating compatibility with a variety of possible of input data rates. Such approximations may cause undesirable frequency components.

SUMMARY OF THE INVENTION

In view of the foregoing background, it is therefore an object of the present invention to provide a circuit for digital signal processing, such as for two-stage re-sampling, that can accommodate a variety of possible data input rates.

This and other objects, features, and advantages according to the invention are provided by a re-sampling circuit comprising a poly-phase finite impulse response (FIR) interpolator; a polynomial interpolator having a sample input connected to a sample output of the poly-phase FIR interpolator; and a numerically controlled oscillator (NCO) having an output partitioned into: Nc integer bits connected to a control input of the FIR interpolator, and Nf fractional bits connected to a control input of the polynomial interpolator. The circuit may also include a reference clock for generating a reference clock signal. The NCO preferably further comprises sample clock generating means for generating a sample clock signal based on the reference clock signal. The FIR interpolator preferably further has a sample clock input for receiving the sample clock signal from the sample clock generating means. In addition, the polynomial interpolator also preferably has an input that is connected to the reference clock so that output samples from the polynomial interpolator are clocked out based upon the reference clock signal.

The sample clock generating means may preferably be provided by a carry output of the NCO. The NCO also preferably further comprises selecting means for permitting selection of at least one of Nc, Nf and a frequency of the sample clock signal. The poly-phase FIR interpolator preferably has a number of phases equal to $2^{Nc}$. For example, Nc may be equal to 4 and the number of phases, therefore, are equal to 16.

The FIR interpolator also preferably has an input for clocking output samples from the FIR interpolator, and the polynomial interpolator also preferably has an input for clocking input samples to the polynomial interpolator. Accordingly, the NCO also preferably further comprises intermediate clocking means for generating an intermediate clock signal to both the input for clocking output samples from the FIR interpolator and to the input for clocking input samples to the polynomial interpolator. The intermediate clocking means may preferably be provided by a carry output from the Nf fractional part of the NCO.

The polynomial interpolator may be provided by one of a quadratic interpolator, a bi-quadratic interpolator, or a cubic interpolator, for example. In addition, the two-stage re-sampling circuit may be used in a modulator circuit if further combined with one or more mixers.

A method aspect of the invention is for controlling a re-sampling circuit operable over a range of input data rates. The re-sampling circuit is of a type preferably comprising a poly-phase FIR interpolator, and a polynomial interpolator having a sample input connected to a sample output of the poly-phase FIR interpolator. The method preferably comprises the steps of: providing a numerically controlled oscillator (NCO) having an input for receiving frequency control words, and an output; and partitioning the output of the NCO into: Nc integer bits connected to the control input of the FIR interpolator, and Nf fractional bits connected to the control input of the polynomial interpolator to thereby permit operation over a range of input data rates.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
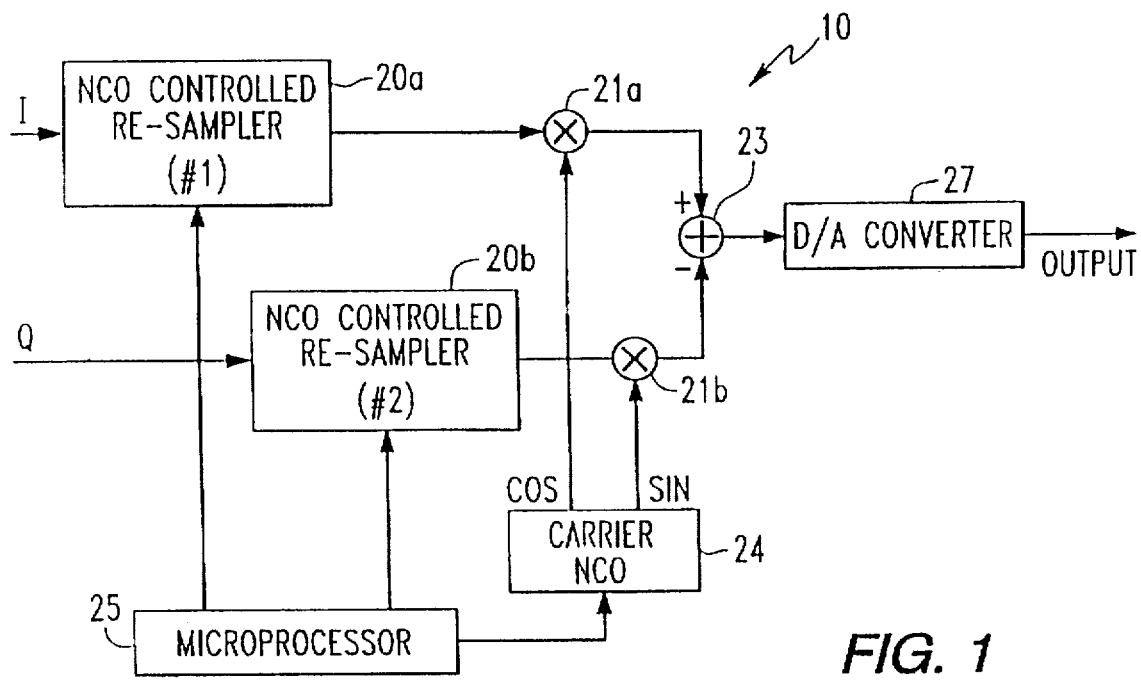
FIG. 1. is a schematic block diagram of a modulator including a two-stage re-sampling circuit in accordance with the present invention.

A pair of NCO controlled re-sampling circuits 20 are included in the modulator 10 as shown in FIG. 1. The modulator 10 includes a first re-sampling circuit 20a driven by the I input and a second re-sampling circuit 20b driven by the Q input as would be readily understood by those skilled in the art. The outputs of the re-sampling circuits 20a, 20b are coupled to respective mixers 21a, 21b in the illustrated embodiment. The mixers 21a, 21b are driven by respective cosine and sine waveforms from the carrier NCO 24. The illustrated microprocessor 25 controls the respective frequencies and starting phases of the first and second re-sampling circuits 20a, 20b and the frequency of the carrier NCO 24 for the mixing stage. The output of the mixers 21a, 21b are coupled to the adder 23, the output of which, in turn, is connected to a digital-to-analog converter 27 in the illustrated embodiment.

Figure 2:
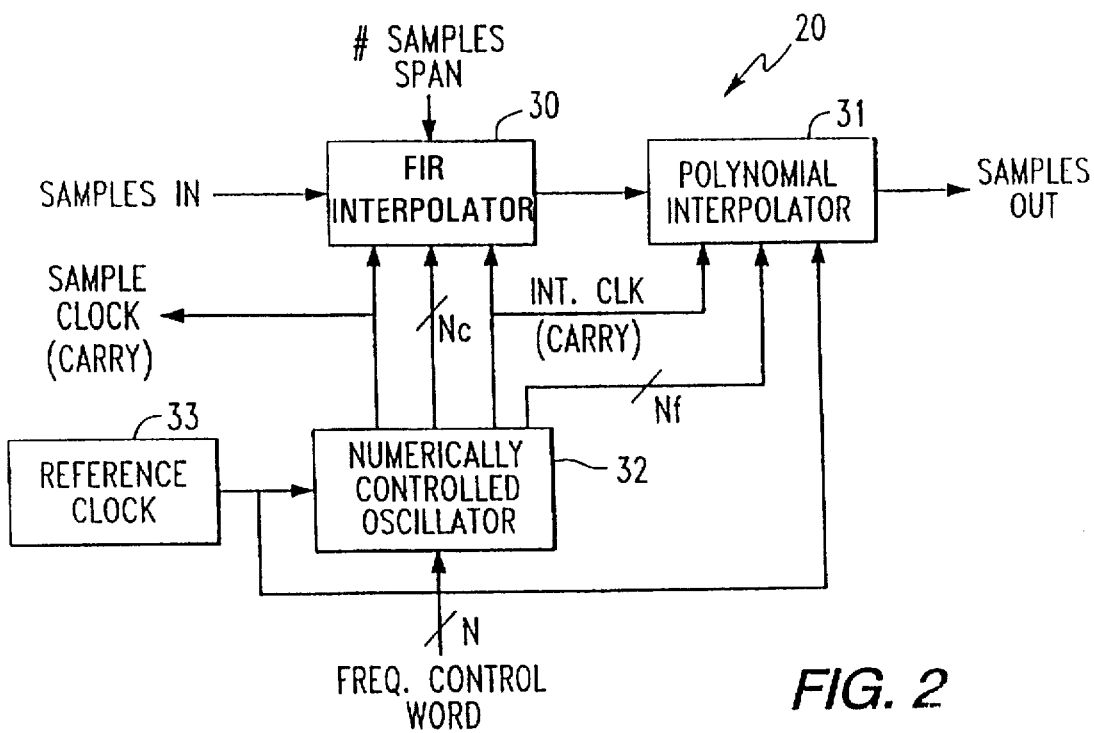
FIG. 2 is a schematic block diagram of the re-sampling circuit in accordance with the present invention.

Referring now more particularly to FIG. 2 the NCO controlled re-sampling circuit 20 is described in greater detail. The re-sampling circuit 20 includes a poly-phase finite impulse response (FIR) interpolator 30; a polynomial interpolator 31 having a sample input connected to a sample output of the poly-phase FIR interpolator; and the NCO 32. The NCO 32 has an output partitioned into: Nc integer bits connected to a filter control input of the FIR interpolator 30, and Nf fractional bits connected to a control input of the polynomial interpolator 31. As would be readily understood by those skilled in the art, the control input of the FIR interpolator 30 selects the phase, and the control input controls $\Delta x$ for the polynomial interpolator 31.

A commercially available NCO of a type that may be used in the re-sampling circuit 10 of the present invention is available from the assignee of the present invention under the designation HSP45116A, for example. A commercially available FIR filter or interpolator along the lines as suitable for the present invention is also available from the assignee of the present invention under the model designation HSP43168/883, for example. For example, the HSP43168/883 allows selection of from one to thirty-two user programmable coefficient sets, with each set consisting of eight coefficients. The active coefficient set may be switched to support poly-phase filtering or interpolating operations. Those of skill in the art will readily appreciate the circuit details of other acceptable NCO and FIR interpolator circuits for use in the re-sampling circuit 20.

The re-sampling circuit 20 may also include a reference clock 33 for generating a reference clock signal. The NCO 32 preferably further comprises sample clock generating means for generating a sample clock signal based on the reference clock signal. The FIR interpolator 30 further has a sample clock input for receiving the sample clock signal from the sample clock generating means. In addition, the polynomial interpolator 31 also preferably has an input for the reference clock so that output samples from the polynomial interpolator 31 are clocked out based upon the reference clock signal. For example, the reference clock may be about 50 MHz in one embodiment of the invention, although those of skill in the art will appreciate that a wide variety of reference clock rates can be accommodated by the re-sampling circuit 20 of the invention.

The sample clock generating means may preferably use an overall carry bit for NCO for the sample clock signal. In other words, the sample clock is the symbol rate clock and is the lowest rate clock signal. The NCO 32 also preferably further comprises selecting means for permitting selection of at least one of Nc, Nf and a frequency of the sample clock signal. The poly-phase FIR interpolator 30 preferably has a number of phases equal to $2^{Nc}$. For example, Nc may be equal to 4 and the number of phases equal to 16.

The FIR interpolator 30 also preferably has an input for clocking output samples from the interpolator, and the polynomial interpolator 31 also preferably has an input for clocking input samples to the polynomial interpolator. Accordingly, the NCO 32 also preferably further comprises intermediate clocking means for generating an intermediate clock signal to both the input for clocking output samples from the FIR interpolator 30 and to the input for clocking input samples to the polynomial interpolator 31. The intermediate clocking means may be provided by a carry output for the Nf fractional output of the NCO 32, as would be readily understood by those skilled in the art.

The polynomial interpolator 31 may be provided by one of a quadratic interpolator, a bi-quadratic interpolator and a cubic interpolator, for example. In addition, higher order polynomial interpolators may also be used.

The bi-quadratic interpolator preferably comprises: first quadratic coefficient generating means for generating a first coefficient set fitting a first quadratic equation to input samples $y_0$, $y_1$ and $y_2$ at $x_{-1}$, $x_0$, and $x_1$, respectively; and second quadratic coefficient generating means for generating a second coefficient set fitting a second quadratic equation to input samples $y_1$, $y_2$ and $y_3$ at $x_0$, $x_1$ and $x_2$, respectively. Bi-quadratic coefficient generating means is preferably provided for generating a bi-quadratic coefficient set based upon the first and second coefficient sets. Output means preferably generates an interpolated value for between $x_0$ and $x_1$ based upon the bi-quadratic coefficient set. The bi-quadratic generating means preferably comprises averaging means for generating the bi-quadratic coefficient set based upon an average of the first and second coefficient sets. The averaging means preferably generates the bi-quadratic coefficient set comprising $b_0$, $b_1$ and $b_2$ so that $b_0=y_1$, $b_1=(-y_3+5y_2-3y_1-y_0)/4$, and $b_2=(y_3-y_2-y_1+y_0)/4$. The output means also preferably comprises means for generating the interpolated value $y(\Delta x)=b_0+\Delta x(b_1+\Delta x b_2)$. The bi-quadratic interpolator provides better aliasing rejection than a single quadratic interpolator, and the coefficient calculation is only slightly more complex for the bi-quadratic interpolator, than for a single quadratic interpolator. Further details for the bi-quadratic interpolator are set forth in copending patent application filed concurrently herewith entitled "Interpolator Using a Plurality of Polynomial Equations and Associated Methods", assigned to the present assignee, having attorney work docket number 18202, and the entire disclosure of which is incorporated herein by reference.

The combination of the FIR interpolator 30 and polynomial interpolator 31 operated under control of the NCO 32 provides an effective two-stage re-sampling circuit with relatively uncomplicated circuitry that can be readily implemented in integrated circuit form, as would be readily understood by those skilled in the art.

The NCO 32 can be considered as a perfect generator of time phase information as would be readily understood by those skilled in the art. The NCO 32 may be implemented as a binary accumulator that naturally rolls over. With a fractional format in accordance with the present invention, the NCO output has accumulator input and output bits. If the input to the NCO 32 is a fraction, $\Delta$, then the NCO rollover or carry frequency is this same fraction times the NCO reference clock frequency, that is, $f_{out}=\Delta \times f_{ref\ clock}$. The NCO 32 can generate a very large number of frequencies ($2^N$). Typical commercially available NCOs have 32 bits, for example, and are therefore capable of synthesizing about 4.3 billion frequencies.

At any reference clock instant, the NCO 32 output (all N bits) indicates that exact phase of the synthesized output.

The time phase has a resolution of $2^{-N}$. For N=32, for example, the time phase resolution is about $2.3 \, e^{-10}$ of a cycle. The output of the NCO 32 can also be formatted as an integer plus a fractional part by shifting the binary point. This does not change the characteristics of the NCO 32 in any way as will be readily appreciated by those skilled in the art. If the output is partitioned into the Nc integer bits and Nf fractional bits, the time phase resolution is $2^{-(Nc+Nf)}$. The Nc bits can be used to address the poly-phase FIR interpolator 30 and the Nf fractional bits can be used by the polynomial interpolator 31 to generate accurate output samples at the reference clock rate.

The fractional output of the NCO 32 in this format greatly simplifies the polynomial interpolator 31 since $\Delta x$ is in the range of 0 to $1-2^{-Nf}$. Accordingly, the poly-phase FIR interpolator 30 performs the general shaping function and the polynomial interpolator 31 performs the fine shaping function. The carry output of the NCO 32 is used to clock samples into the poly-phase FIR interpolator 30. The carry out of the fractional part of the accumulator can clock samples into the polynomial interpolator 31 as shown in the illustrated embodiment.

The number of phases in the FIR interpolator 30 is $2^{Nc}$. The FIR interpolator may also have an arbitrary length for the sample span and would, in general, be programmable as would Nc, Nf and the sample clock frequency, as discussed briefly above. Accordingly, this FIR interpolator 30 can be used at any data rate that the NCO 32 can synthesize with the restriction that $\Delta$ be less than $2^{-Nc}$. This restriction is caused by the requirement that the poly-phase steps be unity. If $\Delta$ is larger, the phase between poly-phase outputs would be some integer greater than 1, thereby destroying the assumption of unit steps into the polynomial interpolator 31. For example, input data rates of from 75 bps to 100 Mbs can be accommodated by the re-sampling circuit 20 of the present invention.

Those of skill in the art will readily recognize that the sample frequency can be increased by reducing Nc. Also, the interpolation range can be increased by increasing Nf. Circuit simulations have shown that the aliasing images for a QPSK modulator with a Square Root of Raised Cosine shaping FIR interpolator 30 (alpha=0.35) were less than −100dBc for a cubic interpolator 31 with Nc=16, Nf=16, and symbol span of 16.

A method aspect of the invention is for controlling a re-sampling circuit 20 operable over a range of input data rates. The re-sampling circuit 20 is of a type preferably comprising a poly-phase FIR interpolator 30, and a polynomial interpolator 31 having a sample input connected to a filter sample output of the poly-phase FIR interpolator. The method preferably comprises the steps of: providing a numerically controlled oscillator (NCO) 32 having an input for receiving frequency control words, and an output; and partitioning the output of the NCO into: Nc integer bits connected to the control input of the FIR interpolator, and Nf fractional bits connected to the control input of the polynomial interpolator to permit operation over a range of input data rates.

The present invention has many applications including in modulators, demodulators, waveform synthesizers, video processors, etc. as would be readily understood by those skilled in the art. For example, the circuit may be readily used in a digital upconverter integrated circuit application as described herein. In addition, the two NCO controlled resamplers 20a, 20b of FIG. 1 may be driven by the same NCO, for example.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A re-sampling circuit operable over a range of input data rates, said re-sampling circuit comprising:
   a poly-phase finite impulse response (FIR) interpolator having a sample input, a control input, and a sample output;
   a polynomial interpolator having a sample input connected to the sample output of said poly-phase FIR interpolator, said polynomial interpolator also having a control input and a sample output; and
   a numerically controlled oscillator (NCO) having an input for receiving frequency control words, and an output partitioned into: Nc integer bits connected to said control input of said FIR interpolator, and Nf fractional bits connected to the control input of said polynomial interpolator to permit operation over a range of input data rates.

2. A re-sampling circuit according to claim 1 further comprising a reference clock for generating a reference clock signal; wherein said NCO further comprises sample clock generating means for generating a sample clock signal based on the reference clock signal; and wherein said poly-phase FIR interpolator further has a sample clock input for receiving the sample clock signal from said sample clock generating means.

3. A re-sampling circuit according to claim 2 wherein said polynomial interpolator also has an input for clocking output samples from said polynomial interpolator that is connected to said reference clock so that output samples from said polynomial interpolator are clocked out based upon the reference clock signal.

4. A re-sampling circuit according to claim 2 wherein said sample clock generating means comprises an overall carry output of said NCO.

5. A re-sampling circuit according to claim 2 wherein said NCO further comprises selecting means for permitting selection of at least one of Nc, Nf and a frequency of the sample clock signal.

6. A re-sampling circuit according to claim 1 wherein said poly-phase FIR interpolator has a number of phases equal to $2^{Nc}$.

7. A re-sampling circuit according to claim 6 wherein Nc is equal to 4 and the number of phases equals 16.

8. A re-sampling circuit according to claim 1 wherein said poly-phase FIR interpolator also has an input for clocking output samples from said poly-phase FIR interpolator; wherein said polynomial interpolator also has an input for clocking input samples to said polynomial interpolator; and wherein said NCO further comprises intermediate clocking means for generating an intermediate clock signal to both the input for clocking output samples from said poly-phase FIR interpolator and to the input for clocking input samples to said polynomial interpolator.

9. A re-sampling circuit according to claim 8 wherein said intermediate clocking means comprises a carry output of said NCO for the Nf fractional bits.

10. A re-sampling circuit according to claim 1 wherein said polynomial interpolator comprises a polynomial interpolator being of at least second order.

7

11. A re-sampling circuit comprising:

a poly-phase finite impulse response (FIR) interpolator having a sample input, a control input, and a sample output; and a numerically controlled oscillator (NCO) having an input for receiving frequency control words, and an output partitioned into: Nc integer bits connected to the control input of said poly-phase FIR interpolator, and Nf fractional bits.

12. A re-sampling circuit according to claim 11 further comprising a reference clock for generating a reference clock signal; wherein said NCO further comprises sample clock generating means for generating a sample clock signal based on the reference clock signal; and wherein said poly-phase FIR interpolator further has a sample clock input for receiving the sample clock signal from said sample clock generating means.

13. A re-sampling circuit according to claim 12 wherein said sample clock generating means uses an overall carry output of said NCO.

14. A re-sampling circuit according to claim 12 wherein said NCO further comprises selecting means for permitting selection of at least one of Nc, Nf and a frequency of the sample clock signal.

15. A re-sampling circuit according to claim 11 wherein said poly-phase FIR interpolator has a number of phases equal to $2^{Nc}$.

16. A re-sampling circuit according to claim 11 wherein said poly-phase FIR interpolator also has an input for clocking output samples from said poly-phase FIR interpolator; and wherein said NCO further comprises intermediate clocking means for generating an intermediate clock signal to the input for clocking output samples from said poly-phase FIR interpolator.

17. A re-sampling circuit according to claim 16 wherein said intermediate clocking means comprises a carry output of said NCO for the Nf fractional bits.

18. A re-sampling circuit comprising:

a polynomial interpolator having a sample input, a control input and an interpolator sample output; and a numerically controlled oscillator (NCO) having an input for receiving frequency control words, and an output partitioned into: Nf fractional bits connected to the control input of said polynomial interpolator, and Nc integer bits.

19. A re-sampling circuit according to claim 18 further comprising a reference clock for generating a reference clock signal; wherein said NCO further comprises sample clock generating means for generating a sample clock signal based on the reference clock signal; and wherein said polynomial interpolator also has an input for clocking output samples from said polynomial interpolator that is connected to said reference clock so that output samples from said polynomial interpolator are clocked out based upon the reference clock signal.

20. A re-sampling circuit according to claim 19 wherein said NCO further comprises selecting means for permitting selection of at least one of Nc and Nf.

21. A re-sampling circuit according to claim 18 wherein said polynomial interpolator also has an input for clocking input samples to said polynomial interpolator; and wherein said NCO further comprises intermediate clocking means for generating an intermediate clock signal to the input for clocking input samples to said polynomial interpolator.

22. A re-sampling circuit according to claim 21 wherein said intermediate clocking means comprises a carry output for said NCO for the Nf fractional bits.

8

23. A re-sampling circuit according to claim 18 wherein said polynomial interpolator comprises a polynomial interpolator being of at least second order.

24. A modulator comprising:

at least one re-sampling circuit, said at least one re-sampling circuit comprising a poly-phase finite impulse response (FIR) interpolator having a sample input, a control input, and a sample output, a polynomial interpolator having a sample input connected to the sample output of said poly-phase FIR interpolator, said polynomial interpolator also having a control input and a sample output, and a numerically controlled oscillator (NCO) having an input for receiving frequency control words, and an output partitioned into: Nc integer bits connected to the control input of said poly-phase FIR interpolator, and Nf fractional bits connected to the control input of said polynomial interpolator to permit operation over a range of input data rates; and at least one mixer connected to said at least one re-sampling circuit.

25. A modulator according to claim 24 further comprising a reference clock for generating a reference clock signal; wherein said NCO further comprises sample clock generating means for generating a sample clock signal based on the reference clock signal; and wherein said poly-phase FIR interpolator further has a sample clock input for receiving the sample clock signal from said sample clock generating means.

26. A modulator according to claim 25 wherein said polynomial interpolator also has an input for clocking output samples from said polynomial interpolator that is connected to said reference clock so that output samples from said polynomial interpolator are clocked out based upon the reference clock signal.

27. A modulator according to claim 25 wherein said sample clock generating means comprises an overall carry output of said NCO.

28. A modulator according to claim 25 wherein said NCO further comprises selecting means for permitting selection of at least one of Nc, Nf and a frequency of the sample clock signal.

29. A modulator according to claim 24 wherein said poly-phase FIR interpolator has a number of phases equal to $2^{Nc}$.

30. A modulator according to claim 29 wherein Nc is equal to 4 and the number of phases equals 16.

31. A modulator according to claim 24 wherein said poly-phase FIR interpolator also has an input for clocking output samples from said poly-phase FIR interpolator; wherein said polynomial interpolator also has an input for clocking input samples to said polynomial interpolator; and wherein said NCO further comprises intermediate clocking means for generating an intermediate clock signal to both the input for clocking output samples from said poly-phase FIR interpolator and to the input for clocking input samples to said polynomial interpolator.

32. A modulator according to claim 31 wherein said intermediate clocking means comprises a carry output of said NCO for the Nf fractional bits.

33. A modulator according to claim 24 wherein said polynomial interpolator comprises a polynomial interpolator being of at least second order.

34. A method for controlling a re-sampling circuit operable over a range of input data rates, the re-sampling circuit comprising a poly-phase finite impulse response (FIR) interpolator having a sample input, a control input, and a sample output; and a polynomial interpolator having a sample input connected to the sample output of said poly-phase FIR interpolator, the polynomial interpolator also having a control input and a sample output; said method comprising the steps of:

provi ding a numerically controlled oscillator (NCO) having an input for receiving frequency control words, and an output; and partitioning the output of the NCO into: Nc integer bits connected to the control input of said poly-phase FIR interpolator, and Nf fractional bits connected to the control input of said polynomial interpolator to permit operation over a range of input data rates.

35. A method according to claim 34 further comprising the steps of:

generating a reference clock signal;

using the NCO for generating a sample clock signal based on the reference clock signal; and receiving the sample clock signal at the poly-phase FIR interpolator.

36. A method according to claim 35 further comprising the step of clocking output samples from the polynomial interpolator based upon the reference clock signal.

37. A method according to claim 36 wherein the step of generating the sample clock signal comprises generating same using an overall carry output of the NCO.

38. A method according to claim 35 further comprising the step of selecting at least one of Nc, Nf and a frequency of the sample clock signal.

39. A method according to claim 34 wherein the partitioning step comprises partitioning the output so that $2^{Nc}$ is equal to a number of phases of the poly-phase FIR interpolator.

40. A method according to claim 34 wherein the poly-phase FIR interpolator also has an input for clocking output samples from the poly-phase FIR interpolator; wherein the polynomial interpolator also has an input for clocking input samples to the polynomial interpolator; and further comprising the step of using the NCO for generating an intermediate clock signal to both the input for clocking output samples from the poly-phase FIR interpolator and to the input for clocking input samples to the polynomial interpolator.

41. A method according to claim 40 wherein the step of using the NCO to generate the intermediate clock signal comprises using a carry output of the NCO for the Nf fractional bits as the intermediate clock signal.

* * * * *